United States Patent Office 3,034,894
Patented May 15, 1962

3,034,894
HARDENING OF GELATIN
Roy A. Jeffreys and Bryan E. Tabor, Harrow, England, assignors to Eastman Kodak Company, Rochester, N.Y., a corporation of New Jersey
No Drawing. Filed June 24, 1959, Ser. No. 822,446
5 Claims. (Cl. 96—99)

This invention relates to sensitive photographic gelatino silver halide emulsions. The problem which has been encountered for a very long time in the manufacture of sensitive photographic gelatino silver halide emulsions has been the difficulty of satisfactorily hardening the gelatin without causing deterioration in the properties of the sensitive silver halide, both at the time of manufacture and on keeping under various conditions of storage.

We have now found that certain oxidation products of monosaccharides, oligosaccharides and their derivatives can be employed as very useful hardeners of sensitive gelatino silver halide black and white emulsions or for silver halide emulsions destined to be used in color photography, e.g. emulsions containing color-forming couplers. These oxidation products of monosaccharides, oligosaccharides and their derivatives can be prepared by any oxidation method that yields predominantly aldehyde groups and a low percentage, less than 12%, of carboxyl groups. One well known oxidation method is by periodic acid or a periodate salt. For instance, oxysucrose can be prepared by oxidation of sucrose with sodium metaperiodate as described by Barry and Mitchell (J.C.S., 1954, 4022). In this preparation the oxysucrose (aldehydo-sucrose) is obtained as a 1 to 2% aqueous solution.

An example of another compound which can be employed according to the present invention is oxy-α-methyl-D-glucopyranoside which can be prepared by oxidation of α-methyl-D-glusopyranoside with periodic acid, as described by Jackson and Hudson (J. Amer. Chem. Soc., 1937, 59, 994).

In the following two examples the compounds of the invention were tested in a fine grain silver iodobromide emulsion containing 6–7% gelatin. All quantities are given in grams per litre of emulsion. The emulsions were coated on glass plates. The speeds are given in arbitrary units, being the step corresponding to a density of 0.2 above fog on an exposure wedge in which the exposure increases by 0.1 log units per step. In every example tested the fog level of the hardened emulsions was no higher than that of the untreated emulsion.

In the results of tests given hereinafter, both ordinary keeping tests and incubation tests are included. In the ordinary keeping tests the material being tested was merely stored in a cupboard at room temperature for the times stated. These keeping tests showed how all the properties of the emulsion were affected by such keeping. The incubation tests were made in order to ascertain in a short time the maximum possible hardening of the gelatin obtainable with the compound being tested; for this purpose the photographic properties of the emulsion being tested were not considered.

Since the most useful hardening is not obtained immediately on coating but only after drying and keeping a few days the first measurements for ordinary keeping tests were made 7 days after coating and drying.

EXAMPLE 1.—OXYSUCROSE

Keeping Tests

| | After 7 days | | After 3 months | |
|---|---|---|---|---|
| | Speed | M.P. (° F.) | Speed | M.P. (° F.) |
| Untreated emulsion | 21.8 | 87 | 21.0 | 92 |
| Emulsion containing oxysucrose (0.3 g./l.) | 22.0 | 104 | 19 | (¹) |
| Emulsion containing oxysucrose (1.0 g./l.) | 21.8 | over 200 | -------- | (¹) |
| Emulsion containing oxysucrose (3.0 g./l.) | 21.0 | over 200 | -------- | (¹) |

¹ In these M.P. tests when the temperature reached the neighborhood of 150° F. the layer did not melt but did leave the support. On raising the temperature further no melting was observed even up to about 200° F.

Incubation Tests

| | 7 days at 42% R.H. and 120° F.—M.P. (° F.) |
|---|---|
| Untreated emulsion | 90 |
| Emulsion containing oxysucrose (0.3 g./l.) | (¹) |
| Emulsion containing oxysucrose (1.0 g./l.) | (¹) |
| Emulsion containing oxysucrose (3.0 g./l.) | (¹) |

¹ In these M.P. tests it was found that when the temperature reached the neighborhood of 150° F. the layer which had not melted left the support and even on then raising the temperature further no melting was observed even up to about 200° F.

EXAMPLE 2.—OXY-α-METHYL-D-GLUCOSIDE

Keeping Tests

| | After 7 days | | After 3 months | |
|---|---|---|---|---|
| | Speed | M.P. (° F.) | Speed | M.P. (° F.) |
| Untreated emulsion | 21 | 82 | 21 | 90 |
| Emulsion containing oxy-α-methyl-D-glucoside (0.3 g./l.) | 21.5 | 83 | 21 | 92 |
| Emulsion containing oxy-α-methyl-D-glucoside (1.0 g./l.) | 21 | 91 | 19 | 106 |

Incubation Tests

| | 3 days at 95% R.H. and 120° F.—M.P. (° F.) | 7 days at 42% R.H. and 120° F.—M.P. (° F.) |
|---|---|---|
| Untreated emulsion | 100 | 91 |
| Emulsion containing oxy-α-methyl-D-glucoside (0.3 g./l.) | 155 | 93 |
| Emulsion containing oxy-α-methyl-D-glucoside (1.0 g./l.) | 200 | 121 |

The following results are for tests performed in a high speed, bromoiodide emulsion optically sensitized with a cyanine dye. The films were exposed in an Eastman type Ib sensitometer, and processed in Kodak Developer DK50 for 5 minutes; fixed, washed and dried. The relative speed numbers used in the table are inversely proportional to the exposure required to produce a density of 0.3 above fog. The melting point data were obtained with unprocessed coatings after one day incubation at 100° F. The value 212° F.—2 minutes indicates that no melting was observed when the strips were subjected to this temperature for 2 minutes, which is the upper limit of the test.

EXAMPLE 3

| Feature | Percent based on weight of gelatin | Relative Speed | γ | Fog | Reticulation, °F. | M.P., °F. |
|---|---|---|---|---|---|---|
| Control | | 100 | 1.32 | .15 | 83 | 87 |
| Oxysucrose, 83% oxidized | 1.2 | 102 | 1.18 | .14 | none | 212°—2 min. |
| As above | 2.4 | 97 | 1.05 | .13 | none | 212°—2 min. |
| Control | | 100 | 1.30 | .11 | 82 | 87 |
| Oxy-α-methyl-D glucoside | .3 | 73 | .90 | .08 | none | 212°—2 min. |
| As above | 1.6 | 71 | .80 | .09 | none | 212°—2 min. |

The following example illustrates the utility of the compounds of the inventions in emulsions destined to be used in color photography.

EXAMPLE 4

The following data are for the test performed in a high speed, bromoiodide emulsion which was optically sensitized to a region between 5000 and 6000 A. and in addition, contained a magenta dye forming coupler suitably dispersed in a high-boiling organic solvent. The film coatings were exposed on an Eastman type Ib sensitometer for 1/50 second to the light emitted by a 500 watt tungsten lamp adjusted to 6100° K. and further modulated by a Wratten #15 filter. The exposed strips were processed in the Kodak E-2 Ektachrome process.

Melting points were taken on unprocessed coatings in a 2 percent sodium carbonate solution.

| Feature | Concentration (percent of gel) | $D_{max}$ | Relative Speed | Melting Point, °F. |
|---|---|---|---|---|
| Control | | >4.0 | 100 | 104 |
| Oxysucrose, 80% oxidized | 2 | 3.74 | 91 | >185 |
| As above | 4 | 3.78 | 95 | >185 |

It should be noted that the lower relative speed values of the coatings containing the hardeners of this invention are probably due to the impermeability of the emulsion to the developer caused by the efficient hardening of the emulsion.

The hardening agents in accordance with our invention are suitable for use not only in gelatino-photographic emulsions, but in aqueous gelatin coating compositions which do not necessarily contain light sensitive materials therein. The hardening effect of these agents upon gelatin is noted even with the use of small proportions thereof. However, it is desirable that at least 0.5% thereof (based on the gelatin) be used. A convenient range of proportions is 0.5–5% of hardening agent based on the weight of the gelatin.

The photographic emulsions used in practicing our invention are of the developing-out type.

The emulsions can be chemically sensitized by any of the accepted procedures. The emulsions can be digested with naturally active gelatin, or sulfur compounds can be added such as those described in Sheppard U.S. Patent 1,574,944, issued March 2, 1926, Sheppard et al. U.S. Patent 1,623,499, issued April 5, 1927, and Sheppard et al. U.S. Patent 2,410,689, issued November 5, 1946.

The emulsions can also be treated with salts of the noble metals such as ruthenium, rhodium, palladium, iridium, and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued August 31, 1948, and antifoggants in higher amounts, as described in Trivelli and Smith U.S. Patents 2,566,245, issued August 28, 1951 and 2,566,263 issued August 28, 1951.

The emulsions can also be chemically sensitized with gold salts as described in Waller et al. U.S. Patent 2,399,083, issued April 23, 1946, or stabilized with gold salts as described in Damschroder U.S. Patent 2,597,856, issued May 27, 1952, and Yutzy and Leermakers U.S. Patent 2,597,915, issued May 27, 1952. Suitable compounds are potassium chloroaurite, potassium aurithiocyanate, potassium chloroaurate, auric trichloride and 2-aurosulfobenzothiazole methochloride.

The emulsions can also be chemically sensitized with reducing agents such as stannous salts (Carroll U.S. Patent 2,487,850, issued November 15, 1949), polyamines, such as diethyl triamine (Lowe and Jones U.S. Patent 2,518,698, issued August 15, 1950, polyamines, such as spermine (Lowe and Allen U.S. Patent 2,521,925, issued September 12, 1950), or bis(β-aminoethyl) sulfide and its water-soluble salts (Lowe and Jones U.S. Patent 2,521,926, issued September 12, 1950).

The emulsions can also be optically sensitized with cyanine and merocyanine dyes, such as those described in Brooker U.S. Patents 1,846,301, issued February 23, 1932; 1,846,302, issued February 23, 1932; and 1,942,854, issued January 9, 1934; White U.S. Patent 1,990,507, issued February 12, 1935; Brooker and White U.S. Patents 2,112,140, issued March 22, 1938; 2,165,338, issued July 11, 1939; 2,493,747, issued January 10, 1950; and 2,739,964, issued March 27, 1956; Brooker and Keyes U.S. Patent 2,493,748, issued January 11, 1950; Sprague U.S. Patents 2,503,776, issued April 11, 1950; and 2,519,001, issued August 15, 1950; Heseltine and Brooker U.S. Patent 2,666,761, issued January 19, 1954; Heseltine U.S. Patent 2,734,900, issued February 14, 1956; Van Lare U.S. Patent 2,739,149, issued March 20, 1956; and Kodak Limited British Patent 450,958, accepted July 15, 1936.

The emulsions can also be stabilized with the mercury compounds of Allen, Byers and Murray U.S. Patent 2,728,663, issued December 27, 1955; Carroll and Murray U.S. Patent 2,728,664, issued December 27, 1955; and Leubner and Murray U.S. Patent 2,728,665, issued December 27, 1955; the triazoles of Heimbach and Kelly U.S. Patent 2,444,608, issued July 6, 1948; the azaindenes of Heimbach and Kelly U.S. Patents 2,444,605 and 2,444,606, issued July 6, 1948; Heimbach U.S. Patents 2,444,607, issued July 6, 1948 and 2,450,397, issued September 28, 1948; Heimbach and Clark U.S. Patent 2,444,609, issued July 6, 1948; Allen and Reynolds U.S. Patents 2,713,541, issued July 19, 1955 and 2,743,181, issued April 24, 1956; Carroll and Beach U.S. Patent 2,716,062, issued August 23, 1955; Allen and Beilfuss U.S. Patent 2,735,769, issued February 21, 1956; Reynolds and Sagal U.S. Patent 2,756,147, issued July 24, 1956; Allen and Sagura U.S. Patent 2,772,164, issued November 27, 1956; and those disclosed by Birr in "Z. wiss Phot.," vol. 47, 1952, pages 2–28; the disulfides of Kodak Belgian Patent 569,317, issued July 31, 1958; the quaternary benzothiazolium compounds of Brooker and Staud U.S. Patent 2,131,038, issued September 27, 1938 or the polymethylene bis-benzothiazolium salts of Allen and Wilson U.S. Patent 2,694,716, issued November 16, 1954; or the zinc and cadmium salts of Jones U.S. Patent 2,839,405, issued June 17, 1958.

The emulsions may also contain speed-increasing compounds of the quaternary ammonium type of Carroll U.S. Patent 2,271,623, issued February 3, 1942; Carroll and Allen U.S. Patent 2,288,226, issued June 30, 1942; and Carroll and Spence U.S. Patent 2,334,864, issued November 23, 1943; and the polyethylene glycol type of Carroll and Beach U.S. Patent 2,708,162, issued May 10, 1955.

The emulsions may contain a suitable gelatin plasticizer such as glycerin; a dihydroxy alkane such as 1,5-pentane diol as described in Milton and Murray U.S. application Serial No. 588,951, filed June 4, 1956; an ester of an ethylene bis-glycolic acid such as ethylene bis(methyl glycolate) as described in Milton U.S. application Serial No. 662,564, filed May 31, 1957; bis(ethoxy diethylene glycol) succinate as described in Gray U.S. application Serial No. 604,333, filed August 16, 1956, or a polymeric hydrosol as results from the emulsion polymerization of a mixture of an amide of an acid of the acrylic acid series, an acrylic acid ester and a styrene-type compound as described in Tong U.S. Patent 2,852,386, issued September 16, 1958. The plasticizer may be added to the emulsion before or after the addition of a sensitizing dye, if used.

The emulsions may contain a coating aid such as saponin; a lauryl or oleyl monoether of polyethylene glycol as described in Knox and Davis U.S. Patent 2,831,766, issued April 22, 1958; a salt of a sulfated and alkylated polyethylene glycol ether as described in Knox and Davis U.S. Patent 2,719,087, issued September 27, 1955; an acylated alkyl taurine such as the sodium salt of N-oleyl-N-methyl taurine as described in Knox, Twardokus and Davis U.S. Patent 2,739,891, issued March 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Knox, Stenberg and Wilson U.S. Patent 2,843,487, issued July 15, 1958; a water-soluble maleoprimarate or a mixture of a water-soluble maleopimarate and a substituted glutomate salt as described in Knox and Fowler U.S. Patent 2,823,123, issued February 11, 1958; an alkali metal salt of a substituted amino acid such as disodium N-(carbo-p-tert. cotylphenoxypentaethoxy)-glutamate as described in Knox and Wilson U.S. patent application Serial No. 600,679, filed July 30, 1956; or a sulfosuccinamate such as tetrasodium N-(1,20-dicarboxyethyl)-N-octadecyl sulfosuccinamate or N-lauryl disodium sulfosuccinamate as described in Knox and Stenberg U.S. patent application Serial No. 691,125, filed October 21, 1957.

The hardeners which we have described may be used in various kinds of photographic emulsions. In addition to being useful in X-ray and other nonoptically sensitized emulsions they may also be used in orthochromatic, panchromatic, and infrared sensitive emulsions. They may be added to the emulsion before or after any sensitizing dyes which are used. Various silver salts may be used as the sensitive salt such as silver bromide, silver iodide, silver chloride, or mixed silver halides such as silver chlorobromide or silver bromoiodide. The agents may be used in emulsions intended for color photography, for example, emulsions containing color-forming couplers or emulsions to be developed by solutions containing couplers or other color-generating materials, emulsions of the mixed-packet type, such as described in Godowsky U.S. Patent 2,698,794, issued January 4, 1955; or emulsions of the mixed-grain type, such as described in Carroll and Hanson U.S. Patent 2,592,243, issued April 8, 1952. These agents can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

These may also be used in emulsions intended for use in diffusion transfer processes which utilize the undeveloped silver halide in the nonimage areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944 and Land U.S. Patents 2,584,029, issued January 29, 1952; 2,698,236, issued December 28, 1954 and 2,543,181, issued February 27, 1951; and Yackel et al. U.S. patent application Serial No. 586,705, filed May 23, 1956. They may also be used in color transfer processes which utilize the diffusion transfer of an image-wise distribution of developer, coupler or dye, from a light-sensitive layer to a second layer, while the two layers are in close proximity to one another. Color processes of this type are described in Land U.S. Patents 2,559,643, issued July 10, 1951 and 2,698,798, issued January 4, 1955; Land and Rogers Belgian Patents 554,933 and 554,934, granted August 12, 1957; International Polaroid Belgian Patents 554,212, granted July 16, 1957 and 554,935, granted August 12, 1957; Yutzy U.S. Patent 2,756,142, granted July 24, 1956 and Whitmore and Mader U.S. patent application Serial No. 734,141, filed May 9, 1958.

Combinations of these antifoggants, sensitizers, hardeners, etc., may be used.

We claim:
1. A gelatin composition comprising gelatin and 0.5–5%, based on the weight of the gelatin, of a hardening agent obtained by the periodate oxidation of a compound selected from the group consisting of the lower alkyl glucosides and the disaccharides having the formula

$$C_{12}H_{22}O_{11}$$

2. A gelatino-silver halide emulsion containing therein 0.5–5%, based on the weight of the gelatin, of a hardening agent obtained by the periodate oxidation of a compound selected from the group consisting of the lower alkyl glucosides and the disaccharides having the formula $C_{12}H_{22}O_{11}$.

3. A gelatin composition comprising gelatin and 0.5–5%, based on the weight of the gelatin of a hardening agent obtained by the periodate oxidation of sucrose.

4. A gelatin composition comprising gelatin and 0.5–5%, based on the weight of the gelatin, of a hardening agent obtained by the periodate oxidation of α-methyl-D-glucoside.

5. A photographic element containing a layer of a composition comprising gelatin, 0.5–5%, based on the weight of the gelatin, of a hardener obtained by the periodate oxidation of a compound selected from the group consisting of lower alkyl glucosides and disaccharides having the formula $C_{12}H_{22}O_{11}$ and a dye-developer compound, said dye-developer compound being both a dye and a silver halide developing agent.

References Cited in the file of this patent

UNITED STATES PATENTS

| 1,468,331 | Soane | Sept. 18, 1923 |
| 2,059,817 | Shepherd et al. | Nov. 3, 1936 |
| 2,472,590 | Kenyon et al. | June 7, 1949 |

OTHER REFERENCES

Barry et al.: J.C.S., 1954, page 4022.

Chemistry of Organic Compounds, Noller Tnd ed., W. B. Saunders Company, Philadelphia, page 381, 2nd para.

Gortner et al.: Outlines of Biochemistry 3rd ed., 1953, John Wiley and Sons, Inc., New York, pages 712–723.